United States Patent Office 2,800,962
Patented July 30, 1957

2,800,962

SURFACE-ACTIVE AGENTS IN WELL TREATING

Arthur W. Garst, Tulsa, Okla., assignor to Pan American Petroleum Corporation, a corporation of Delaware No Drawing. Application January 15, 1954,
Serial No. 404,393

4 Claims. (Cl. 166—9)

This invention relates to treating wells and particularly to clearing congested zones of subterranean formations immediately surrounding a well.

In the prior art, it has been suggested that certain additives be employed in oil injected into oil-bearing formations penetrated by a well; the additives serving to produce a more effective removal of water which blocks the flow of oil toward the well. Such treatments are referred to as oil squeeze operations. It has also been suggested that the same type of additives might be employed in water injected into wells, as in water drive operations, to remove more effectively the oil from the zones surrounding the injection well. It has been found that frequently all of the water is not removed from the restricted zone of flow around an oil-producing well and considerable residual oil often remains in the formation around a water-injection well. It should be noted that, in both operations, the primary objective is to increase oil production. When an oil-producing well is treated to remove a water block, the rate of production of oil into the well is increased. When a water injection well is treated, both the rate of water injection and, hence, the rate of oil production, and also the quantity of oil produced from the formation are increased.

It is an object of this invention to provide a method for increasing the efficiency of removal of one of the liquid phases in an oil-bearing formation from the zone around a well penetrating the formation. Another object of this invention is to increase the oil production from an oil-producing formation. A specific object is to provide a method for removing a water block from the zone immediately surrounding an oil-producing well. Another specific object is to provide a method for increasing the rate and volume of oil produced in a water-drive operation.

In general, I accomplish the objects of my invention by injecting into an oil-bearing formation at least two batches of flushing liquid; each batch containing in solution a surface-active agent of a type different from that in the other batch. When reference is made to a type of surface-active agent, one of four types is generally intended. These are: cationic, anionic, water soluble nonionic and oil soluble nonionic. These four classes will be further described hereinafter. For purposes of brevity the terms cationic, anionic, and nonionic are employed generally in the following specification and claims in place of the more cumbersome equivalent terms. For example, the term cationic should be regarded as equivalent to cationic surface-active agent or cation-active agent.

The increased effectiveness of this treatment by two batches of solutions containing different surface-active agents is thought to be due to a reversal of emulsion type which tends to form in the presence of the different types of surface-active agents. For example, cationic agents in general tend to cause formation of water-in-oil emulsions. The type which actually forms in any specific case depends, of course, on many factors, such as the ratio of oil to water present, the presence and concentration of other emulsifying agents and the presence or absence of inorganic salts. The tendency, however, is to form an emulsion of the water-in-oil type. Anionic agents, on the other hand, tend to form oil-in-water type emulsions. Again, other factors may result in a different type of emulsion actually forming in some cases, but the anionic agent itself tends to cause the formation of emulsions of the oil-in-water type.

If, for example, two batches of oil are injected into an oil-producing formation penetrated by a well, to remove a water block, the first batch containing a cationic and the second an anionic surface-active agent, a water-in-oil emulsion will first tend to form and then an oil-in-water emulsion. An accompanying factor is the tendency to reverse the charge or so-called electrokinetic potential at the oil-water interface. This change is probably a major factor in causing the switch in the type of emulsion which tends to form. At least it is a factor which disturbs the equilibrium established when a single type of additive is employed. If the alternating batches of solution contain nonionic surface-active agents, the electrical factor is, of course, substantially absent. Therefore, there is present only the tendency to reverse the type of emulsion to upset the equilibrium established with a single type of additive.

The four types of surface-active agents fall into two groups. One group consists of cationics and oil soluble nonionics which tend to form water-in-oil emulsions. The other group consists of anionics and water-soluble nonionics which tend to form oil-in-water emulsions. Alternation of a member of one of these groups with a member of another group is preferred. However, switching from cationic to oil-soluble nonionic will change the charge or electrokinetic potential of the emulsion droplets from positive to neutral. This is a factor sufficient to disturb the equilibrium established when using a single additive. The value of the nonionic in such a case is to reduce the interfacial tension between oil and water and to displace the cationic which may be adsorbed on the formation surface so that this material progresses through the formation rather than being lost in the first few feet of travel. If anionic emulsifiers are naturally present in the oil or water in the formation, then a switch from cationic to nonionic actually results in a switch from an induced positive to a natural negative charge or electrokinetic potential. The same reasons for using a cationic followed by an oil-soluble nonionic, or vice versa, are applicable to using an anionic and a water-soluble nonionic.

One other factor which should be mentioned is formation wettability. In general, if a formation is oil-wet, a water-in-oil type of emulsion tends to form. If the formation is water-wet, the emulsion tends to be of the oil-in-water type. It is difficult to distinguish causes and effects in this situation; that is, it cannot be stated with certainty whether wettability of the formation controls the type of emulsion which forms or if the type of emulsion controls the wettability. It is more probable that the same factors which cause an oil-in-water type of emulsion to form also cause the formation to be water-wet. Thus, both wettability and type of emulsion are probably effects of the same causes. This becomes important in the water drive aspects of my invention. In the past, it has been customary to flood principally oil-wet reservoirs, since, if the water phase is continuous, flood water flows along the continuous paths and displaces little oil. By reversing the type of emulsion which tends to form, thereby reversing the wettability of the formation, it becomes immaterial whether the formation is naturally oil-wet or water-wet. Each time the type of surface-active agent is changed, the wettability tends to change from oil-wet to water-wet or vice versa. This is particularly true if one of the types of surface-active agents is cationic or oil-soluble nonionic and the other type is anionic or water-soluble nonionic. Thus, my process also offers a means for water driving water-wet oil-bearing formations.

In general, the surface-active agents suitable for use in my process should contain an oil-soluble portion which includes at least about twelve carbon atoms. This portion of the molecule may contain groups such as ether or ester linkages and substitution groups such as the halogens. Since such groups normally increase the cost of producing the surface-active agent, it is generally preferred to employ a simple hydrocarbon radical for the oil-soluble portion of the molecule. This radical may be aliphatic, aromatic or cycloaliphatic. The preferred types are the straight chain saturated aliphatic hydrocarbons and the alkylated aromatics. The water-soluble portion of the various kinds of surface-active agents differentiates the types from each other. In anionics, the water-soluble portion is an anionic radical such as a sulfonic or a carboxylic acid group. In cationics, the water-soluble group is almost always an amine radical of some type, although phosphorus and sulfur can sometimes be substituted for nitrogen to form phosphonium or sulfonium compounds. In the nonionics, the water-soluble portion is generally a polyhydric alcohol such as glycerol, sorbitol, polyethylene glycol or the like. Sometimes amides may be employed. In general, the water-solubility of the nonionics depends on the number of oxygen or nitrogen atoms associated with one end of the molecule. General rules have been set up in the past for determining whether such a material will be predominately water-soluble or oil-soluble. It is suggested, however, that a more certain means of determining whether a material is oil-soluble or water-soluble is by a simple physical test to determine the degrees of solubility in water and in a hydrocarbon solvent such as kerosene. It is particularly important for purposes of my invention to determine whether a nonionic is water-soluble or oil-soluble since this determination indicates in which of the two types of nonionics the material is to be classified. The question is also important in connection with the cationics and anionics. If a water block is to be removed from the zone surrounding an oil-producing well, an oil-soluble material should be employed since an oil solvent will be used. In a water drive operation, obviously the additive must be water-soluble. In general, both anionic and cationic surface-active agents are oil-soluble until neutralized by forming their salts with inorganic bases or acids respectively. The salts, in general, are water-soluble. For further descriptions of the various types of surface-active agents and their solubilities, reference should be made to any of the recent texts on this subject. An excellent source of information on this subject is Surface Active Agents by Schwartz and Perry, published in 1949 by Interscience Publishers, Inc. In either water-drive or oil-squeeze operations agents may be employed which are either predominantly oil-soluble or predominantly water-soluble so long as the agents are soluble to the desired extent in the solvent employed. Thus, for example, when reference is made to a type of surface active agent to be used in water drive, the oil-soluble non-ionics should be regarded as a possible type. Many of these materials, while much more oil-soluble than water-soluble, have more than ample solubility in water to reach the level of concentrations required in water drive operations.

Examples of suitable cationic materials for purposes of my invention are amines such as octadecyl amine or the recently developed diamines such as Armour's Duomeen-T which has the formula $RNH(CH_2)_3NH_2$ in which R represents predominantly saturated hydrocarbon radicals containing from sixteen to eighteen carbon atoms. The preferred class of cationics is the quaternary amines such as methyl dodecyl benzyl trimethyl ammonium chloride.

Examples of anionics are the fatty acids such as lauric or stearic acids, the sulfonates such as sulfonated castor oil or the sulfates such as the sulfate of oleyl alcohol. The preferred type of anionics consists of the sulfonates, particularly the alkylated aromatic sulfonates such as sodium octyl napthalene sulfonate. One type of the oil-soluble nonionic surface-active agents consists of the fatty acid esters of polyhydric alcohols such as polyoxyethylene sorbitol tetraoleate containing about six mols of ethylene oxide per mol of sorbitol. Another type of oil-soluble nonionic consists of the ester free ethers of high molecular weight alcohols with polyhydric alcohols. An example of this type of material is polyoxyethylene lauryl alcohols containing about five ethylene oxide groups in the polyethylene glycol radical.

The water-soluble nonionics can, in general, be prepared from the corresponding oil-soluble types by adding from about five to twenty or more ethylene oxide groups per molecule of the oil-soluble material. An example of such a compound is lauryl alcohol which has been etherified with polyethylene glycol containing about twenty ethylene oxide groups.

It will be apparent that in some cases it may be desirable to employ mixtures of various surface-active agents in a single batch of injected solution. If one of these materials is nonionic and another is ionic, the mixed surface-active agents should be regarded as being of the same type as the ionic material employed. If cationic and anionic additives are mixed in other than equal molecular quantities, the mixture should be regarded as being of the predominate ionic type. If anionic and cationic materials are mixed in quantities which neutralize each other, then the mixture can be employed in much the same way and with the same effects in general as the nonionics and should be so classified for most purposes in my process.

In determining the concentrations of surface-active agents which should be employed in the solutions, due consideration must be taken of several factors. Obviously, sufficient material must be used to produce an effect on wettability, emulsion charge or electrokinetic potential, or on the type of emulsion which tends to form. With regard to this requirement, the concentration should be as high as possible. On the other hand, it is well known that most of the surface-active agents are good emulsifiers if employed in concentrations higher than about one or two percent. It is further known that if stable emulsions are produced in a formation, the permeability of the formation is greatly reduced. Therefore, there is a definite upper limit of one or two percent on the concentration of most surface-active agents injected into most oil-bearing formations. In addition to the effects on wettability, electrical charge and emulsion-forming tendency, it is usually important to decrease the interfacial tension between the water and oil. Here again, in general, the higher the concentration, the lower the interfacial tension. It must be concluded that concentrations as high as possible should be employed without causing excessive emulsification of oil and water in the formation. An advantage of my process is that the concentration of additive need not be as high as in previous processes since each succeeding batch of alternating surface-active agents tends to displace the last preceeding batch of surface-active agent adsorbed on the formation. Thus, the concentration of additive in each batch tends to remain more constant as it proceeds through the formation than in past processes. Considering all of the factors involved, I generally prefer to employ a concentration of additive in the range between .01 and 1.0 percent. The preferred portion of this range falls within the limits between about .02 and .2 percent by weight.

In applying my process to the removal of water block from around an oil-producing well, it is possible to inject a solution of a first type of surface-active agent, withdraw this solution, and then inject a solution of a second type of surface-active agent. The preferred procedure, however, is to inject a first batch of solution containing a first type of surface-active agent, follow the first batch immediately by a batch containing a second type of additive and then produce the well. This simple two-step treatment is preferred in this application since it is generally quite effective and at the same time is inexpensive. More than two batches of solution containing either two additives alternately or three or even all four types of surface-active agents in series can, of course be employed. It is also possible to precede the first batch by a preliminary volume of solvent free from additive. Under such conditions the solvent can also be employed between batches containing different surface-active agents as well as following the final batch. More complex processes of this nature generally are not necessary. When removing a water block, the solvent should, of course, be of a non-aqueous oily nature. Crude petroleum oil, or a fraction thereof, is usually preferred as a solvent for economic reasons. Other hydrocarbon solvents such as the aromatics, for example benzene, may be employed. Mutual solvents for oil and water, such as alcohols, ketones, ethers and the like may be used where the benefits are sufficient to justify the additional expense.

When my invention is applied to a water drive operation, it is generally considered advisable to precede the first batch of additive-containing solution by a batch of water containing salts which will not react with the additive to destroy its surface-active properties as by forming precipitates which would remove the additive from solution. Such salts may be defined as compatible salts. Whether a salt is compatible or not depends upon the type of surface-active agent which is to follow. For example, sodium chloride is compatible with substantially all the agents. Magnesium sulfate is sufficiently neutral to be compatible with most of the non-ionics, but would probably form a water-insoluble magnesium salt with many of the anionics. Calcium chloride is compatible with most cationics and ester-free nonionics, but will form precipitates with most anionics, and its water solutions are sufficiently acid to tend to cause hydrolysis of nonionics containing an ester linkage. It is suggested that fresh water be employed, if possible both to precede the flood water and as a solvent for the surface-active agents in the water drive operation. If fresh water is harmful to the oil-bearing formation, then a dilute natural oil-field brine should be used which contains little if any salts of metals other than the alkali metals. A synthetic brine of sodium chloride may be employed if necessary. Intermediate batches of water between cationic and anionic containing batches may also be employed. In water drive operations, it has been found advisable usually to alternate several times the type of surface-active agent injected, since a single change in type seldom produces as complete a removal of oil as will several of such alternations. Here again, it is possible either to alternate two types of surface-active agents or to employ three or even all four types. The water drive operation may be applied either to newly drilled or to depleted or even previously water-flooded formations.

With regard to the quantities of solvent employed in the various applications of my invention, consideration must be given to not only the type of application but to factors such as the probable extent of the water blocked zone around an oil-producing well, to well spacing and to porosity values of formations in a water drive operation. In both cases, the thickness of the formation is, of course, an important factor. In oil-squeeze operations to remove the water block from around an oil-producing well, an arbitrary figure which has been adopted is to use between about 2 and 20 gallons of solution for each foot of thickness of the formation. This quantity should be divided between the two or more batches to be injected. The division should be equal but need not necessarily be so. It will be apparent that smaller or larger volumes may be used in some cases within the spirit of my invention.

In water drive operations, the amount of water injected in each batch should be sufficient so that the band of water will be about 10 feet wide when it reaches the output well. For a 600 foot spacing and a 5-spot injection system, this means that each batch of injected solution should contain about 30,000 to 40,000 gallons for each foot of thickness of formation into which it is injected. This volume allows for about 20 percent porosity. For different well spacings and different porosity values, this quantity should be varied accordingly. It will be noted that the volume of each succeeding batch can be somewhat smaller than that of the one which preceeded it since the volume which it must occupy at the time the flood is completed will be somewhat smaller than that of the preceeding batch. The first 10 or 20 batches, if that many are employed, should be within the range suggested, however, in case economic quantities of oil are still being produced from the formation when these batches reach the output wells. In general, the number of batches injected in a water flood operation must be at least two in order that a change of surface-active agents can be employed. It is preferred that at least 10 changes of surface-active agents be made in such an operation. As many as 20 or 30 changes, or even more, may be employed in some cases.

My invention will be better understood from consideration of the following example:

A core 1¾ inches in diameter and 13 inches long was cut horizontally from a sample of Torpedo sandstone. The sample was obtained from an outcrop near Tulsa, Oklahoma. The porosity of the core was about 25 percent, the total pore volume of the core being, therefore, about 127 ml. The core was mounted inside a rubber sleeve. Around the sleeve 150 pounds per square inch of pressure was applied to effect a seal between the sleeve and the core. To eliminate air from the core it was purged with carbon dioxide. The carbon dioxide was then displaced or dissolved by brine containing 10 percent by weight of sodium chloride. The core was then flushed with 5 pore volumes of a narrow-boiling petroleum fraction containing predominantly hydrocarbons having from 10 to 12 carbon atoms per molecule. At the completion of this treatment the core simulated an oil-filled sandstone formation containing about 34 percent brine and 66 percent oil by volume. Flooding was then begun with the 10 percent brine, using a 3 pound per square inch differential pressure across the core. About ⅓ pore volume of brine reduced the oil saturation of the core to about 43 percent. Very little additional oil was produced by flooding the core with a little over 1½ pore volumes of additional brine. Flooding was then begun alternating two batches of the brine containing 500 parts per million by weight of surface active agents. One of the batches contained methyl dodecyl benzyl trimethyl ammonium chloride, a cationic surface active agent. The other batch contained sodium octyl naphthalene sulfonate, an anionic surface active agent. First 50 ml. of the batch containing the cationic were introduced and then 50 ml. of the batch containing the anionic. After these first two 50 ml. batches, succeeding portions of the alternated batches contained only 25 ml. Little if any oil appeared until a little over one pore volume of brine was introduced. Then oil began to appear with a water-to-oil ratio of about 9 to 1. A total of 350 ml. of brine containing the alternated cationic and anionic were introduced into the core. This brine displaced about 16 ml. of oil. At $0.35/lb. for chemicals and $0.02/bbl. for brine, the cost of materials for producing the oil was about $1.80/bbl. This is considerably below prices for crude oil in many areas, particularly in Pennsylvania.

From the foregoing description and example it will be apparent that my process accomplishes the objects of my invention. By alternating the types of surface-active agents in solutions injected into oil-bearing formations, the efficiency of removal of the desired phase is increased to the extent that in water drive operations sufficient additional oil, over that obtainable by use of water alone, can be obtained to more than pay for the cost of chemicals and water injected. The same process applied to oil-producing wells will, of course, more effectively removes water blocking the flow of oil to the well.

I claim:

1. An improved water drive process for recovering the oil from oil-bearing formations comprising injecting into the formation through a first well a batch of water containing from about 0.01 to 1 percent by weight of a first type of surface-active agent, subsequently injecting into said formation through said first well another batch of water containing from about 0.01 to 1 percent by weight of a second type of surface-active agent, and withdrawing from said formation through a second well an increased volume of oil said types of surface-active agents being selected from the group consisting of cationic, anionic, water-soluble non-ionic and oil soluble non-ionic, wherein said agents contain an oil soluble portion having at least about 12 carbon atoms and a water-soluble portion selected from the group consisting of cationic, anionic, and non-ionic radicals.

2. The method of claim 1 in which one of the types of surface-active agents is cationic and the other is anionic.

3. The method of claim 2 in which said cationic is methyl dodecyl benzyl trimethyl ammonium chloride and said anionic is sodium octyl naphthalene sulfonate.

4. An improved water-drive process for recovering the oil from oil-bearing formations comprising: first, injecting into said formation through a first well a batch of water containing only salts which are compatible with the surface-active agents to be injected subsequently; second, injecting into said formation through said first well a second batch of water containing from about 0.01 to 1 percent by weight of a first type of surface-active agent; third, injecting into said formation through said first well a third batch of water containing from about 0.01 to 1 percent by weight of a second type of surface-active agent, and withdrawing from said formation through a second well an increased volume of oil said types of surface-active agents being selected from the group consisting of cationic, anionic, water-soluble non-ionic and oil soluble non-ionic, wherein said agents contain an oil soluble portion having at least about 12 carbon atoms and a water-soluble portion selected from the group consisting of cationic, anionic, and non-ionic radicals.

References Cited in the file of this patent

UNITED STATES PATENTS

| | | |
|---|---|---|
| 2,233,382 | De Groote et al. | Feb. 25, 1941 |
| 2,259,875 | Bent et al. | Oct. 21, 1941 |
| 2,288,857 | Subkow | July 7, 1942 |
| 2,342,106 | Jones et al. | Feb. 22, 1944 |
| 2,345,713 | Moore et al. | Apr. 4, 1944 |
| 2,354,203 | Garrison | July 25, 1944 |
| 2,465,237 | Larsen | Mar. 22, 1949 |
| 2,669,306 | Teter et al. | Feb. 16, 1954 |

OTHER REFERENCES

"Treatment of Oil Sands with Surface-Active Chemicals," C. F. Bonnet, May 22, 1941, 7 pages.